United States Patent

[11] 3,582,041

[72] Inventor Werner K. Priese
 Barrington, Ill.
[21] Appl. No. 799,334
[22] Filed Feb. 14, 1969
[45] Patented June 1, 1971
[73] Assignee Hills-McCanna Company
 Carpentersville, Ill.
 Continuation-in-part of application Ser. No. 560,488, June 27, 1966, now abandoned.

[54] VALVE PACKING BOX ASSEMBLY
 12 Claims, 7 Drawing Figs.
[52] U.S. Cl. ................................................. 251/304, 251/214
[51] Int. Cl. .................................................. F16k 5/00
[50] Field of Search ...................................... 251/214, 304, 309, 317; 277/102, 173, 177

[56] References Cited
 UNITED STATES PATENTS

| | | | |
|---|---|---|---|
| 1,945,151 | 1/1934 | Marsh | 277/124X |
| 2,217,038 | 10/1940 | Alley | 277/116.8 |
| 2,922,668 | 1/1960 | Haake | 277/124X |
| 3,030,068 | 4/1962 | Priese | 251/214 |
| 3,091,471 | 5/1963 | Lawless et al. | 277/112 |
| 3,218,051 | 11/1965 | Doetsch | 277/177X |
| 3,231,235 | 1/1966 | Anderson et al. | 251/214 |

Primary Examiner—Henry T. Klinksiek
Attorney—Olson, Trexler, Wolters & Bushnell

ABSTRACT: A packing box assembly for a valve unit of the type including a body member having a passageway therethrough and an aperture in said body member communicating with said passageway, a valve element disposed within said body member for selective blocking and unblocking of said passageway, and stem means interconnected with said valve element for the operation thereof and extending outwardly through said aperture. The packing box assembly for said unit is comprised of a pair of annular seal ring seats axially spaced and disposed about said aperture, said seal ring seats cooperating with the stem to define seal ring-receiving chambers, and a seal ring disposed in each said chamber. Each said seal ring is in the form of a frustoconical member having cylindrical inner and outer peripheral surfaces, and being constructed of a resilient, plasticlike material. The seal ring members and the seal ring receiving chambers are constructed such that upon assembly of said seal rings in said chambers the cylindrical inner and outer peripheral surfaces of said rings will be in sealing engagement with the stem and the seal ring seat, respectively, and the drawing of said packing box assembly into tight sealing engagement places said seal ring members in compression. The packing box assembly also has the seal ring-receiving chambers disposed such that the compressive forces set up during final assembly will directly oppose and preclude rocking of the stem with respect to the body member.

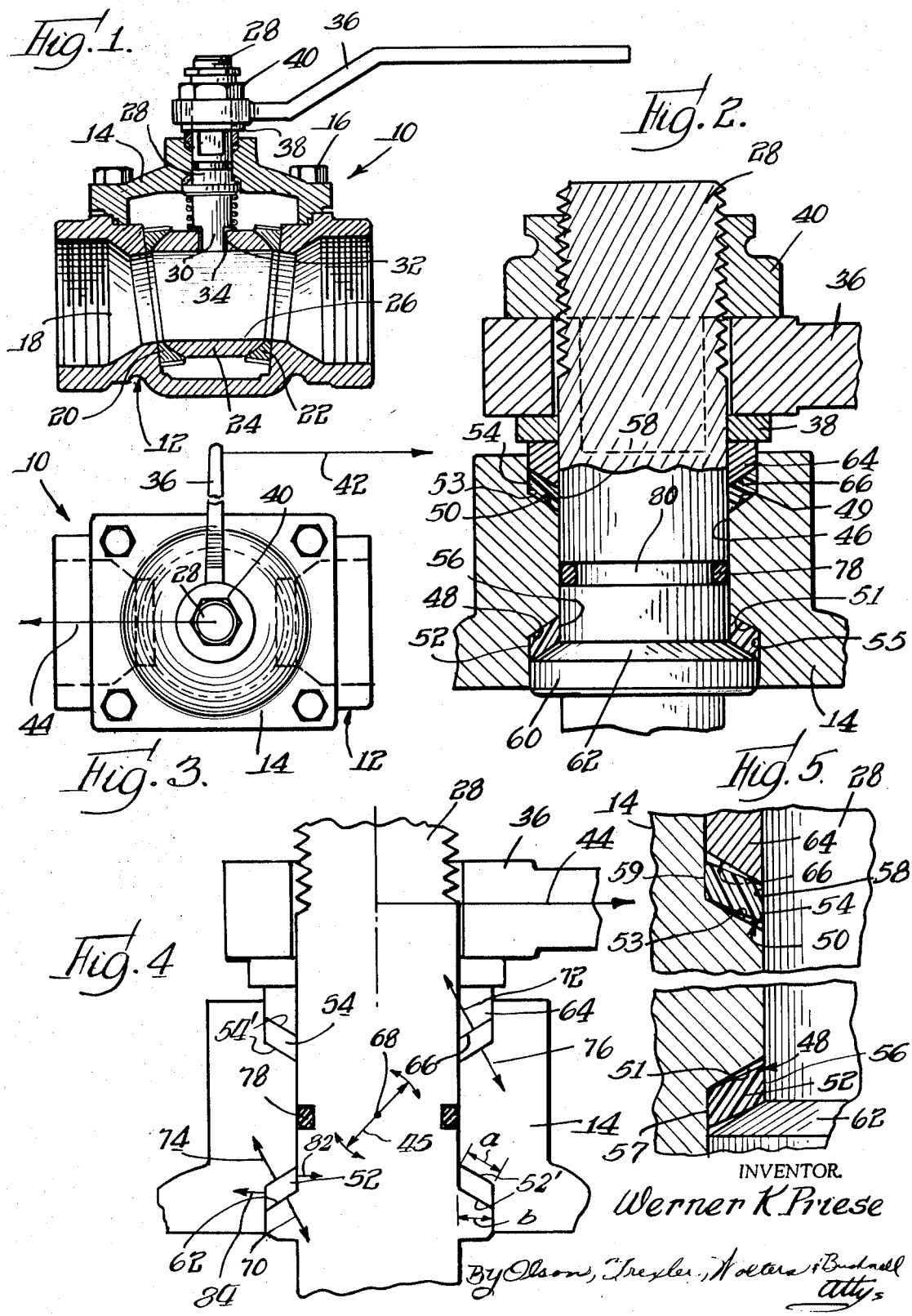

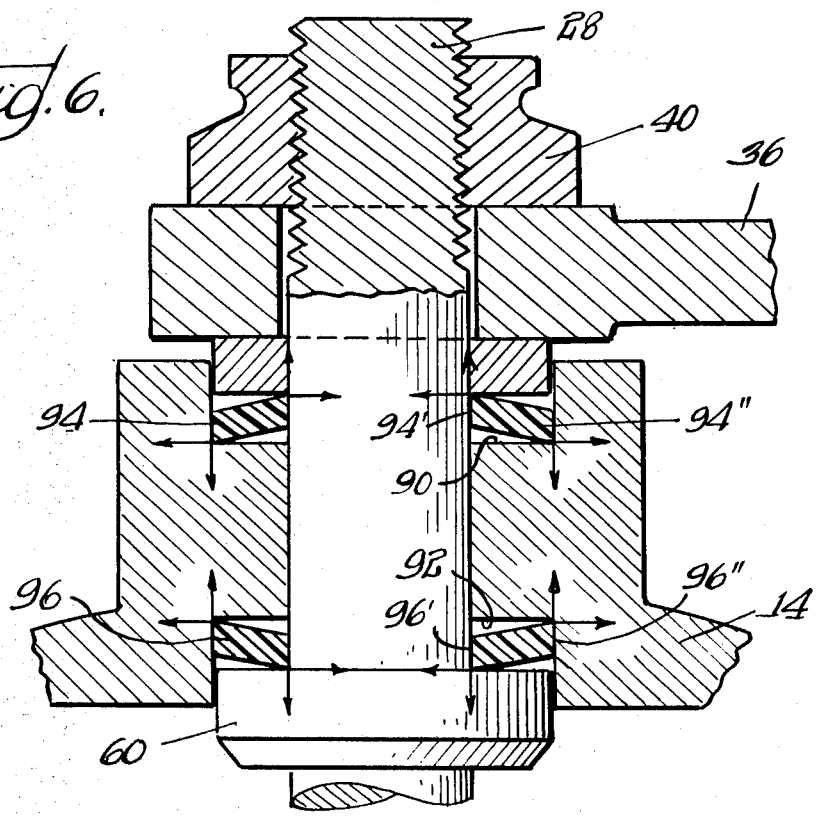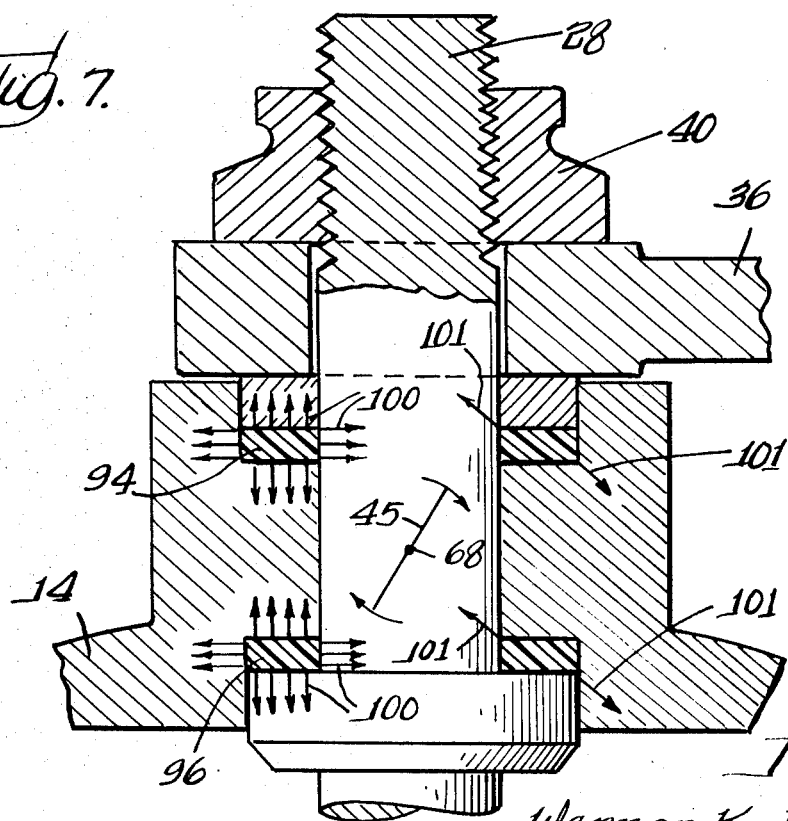

VALVE PACKING BOX ASSEMBLY

REFERENCE TO RELATED APPLICATION

The present application is a Continuation-in-Part of U.S. Application Ser. No. 560,488, filed June 27, 1966 in the name of the applicant herein, and now abandoned.

BACKGROUND OF INVENTION

The present invention relates to valve units and more specifically to valve units of the type having a rotatable element adapted to be turned between open and closed positions.

Various types of valve units utilize a ball or other rotatable element for opening and closing the valve. In general, such valve units include a rotatable stem which extends through a valve housing and which is operatively connected with the ball or other rotatable element, said unit employing a packing box assembly preventing leakage along the length of said stem. This stem is frequently actuated by means of a lever mounted on its outer end; and the necessity of projecting the valve stem through an opening in the valve housing creates a possibility of leakage around the stem. This possibility is increased by the need for the stem to rotate and also by the presence of forces transmitted to the stem by the actuating lever which forces tend to shift the stem transversely to its axis of rotation or to pivot the stem about a second axis generally perpendicular to its normal axis of rotation.

An important object of the present invention is to provide a valve unit constructed so as to minimize any possibility of leakage around a rotatable valve stem element of the unit.

A more specific object of the present invention is to provide a valve unit having a packing box assembly which resists forces tending to pivot the valve stem about an axis extending transversely of the normal axis of rotation of the stem whereby minimize the possibility of leakage and whereby to reduce both wear and maintenance costs.

A further object of the present invention is to provide a packing box assembly for a valve unit which will maintain an adequate seal, and which will set up forces tending to resist pivoting of the valve stem.

Still another object of the invention is the provision of a packing box assembly employing a novel sealing means which will assure a fluid tight assembly even though subject to wear during use of the valve.

Other objects and advantages of the present invention will become apparent from the following description and the accompanying drawings, wherein:

DESCRIPTION OF THE DRAWINGS

FIG. 1 is a partial sectional view of a valve unit incorporating features of the present invention.

FIG. 2 is an enlarged, fragmentary, partial sectional view of the packing box assembly of the unit of FIG. 1 showing features of this structure in greater detail.

FIG. 3 is a plan view of the structure shown in FIG. 1.

FIG. 4 is a schematic view similar to FIG. 2 and indicating certain of the forces to which the valve stem of the unit may be subjected during operation.

FIG. 5 is a fragmentary view showing the initial condition of the seal rings.

FIG. 6 is an enlarged, fragmentary, partial sectional view of a modified form of the present invention, showing the condition of the sealing rings prior to tightening of the packing box assembly.

FIG. 7 is a view similar to FIG. 6, but showing the condition of the seals after the packing box assembly has been tightened or drawn to the operating condition.

DESCRIPTION OF THE ILLUSTRATED EMBODIMENTS

Referring now more specifically to the drawings and particularly to FIG. 1, a valve unit 10 incorporating features of the present invention comprises body means including a main body 12 and a bonnet 14 removably secured to the body 12 by screws 16 or other suitable fastening means. The body 12 is provided with a fluid passageway 18 therethrough partially defined by axially spaced annular seats or seal rings 20 and 22. A rotatable ball element 24 is disposed between and in engagement with the seats 20 and 22.

The ball element 24 is formed with a passageway 26 therethrough adapted to be aligned with the seats 20 and 22 for opening the valve unit. Means including a valve stem 28 are connected with the ball element for turning the ball element 90° from the position shown in FIG. 1 for closing the valve. The stem 28 includes an axially projecting blade element 30 at its inner end, blade element 30 loosely entering a slot 32 in the upper end of the ball element. It will be noted that a clearance 34 is provided between the walls of the slot 32 and the blade element 30 whereby the ball element is entirely confined by and supported by the seats 20 and 22.

In order to turn the valve stem 28, a handle or lever 36 is nonrotatably mounted on an outer exposed end portion of the stem and is secured axially against a travel stop 38 by a retainer nut 40. As indicated in FIG. 3, the handle 36 may be actuated for rotating the stem by applying a turning force in the direction of the arrow 42. The application of such a force tends to rotate the stem about its longitudinal axis; and at the same time, a rocking force is directed along arrow 44, shown in FIGS. 3 and 4, generally transversely of the axis of the stem and adjacent an outer end of the stem. As a result, the rocking force applied in the direction of arrow 44 tends to pivot the stem 28 about an axis disposed in a plane extending transversely of the longitudinal or rotational axis of the stem. In other words, the rocking force along arrow 44 tends to rotate the upper end of the stem in one direction and the lower end of the stem in the opposite direction, as indicated by arrow 45 in FIG. 4.

In accordance with a feature of the present invention, the valve unit 10 is provided with a packing box assembly for rotatably supporting the valve stem 28 in a cylindrical aperture 46 formed in a wall of bonnet 14, while assuring sealing of the aperture and opposing rocking movement of said stem. More specifically, in the embodiment of FIGS. 1—5 the bonnet is formed with a seal ring seat 48 surrounding an inner end portion of the aperture 46 and an additional, axially spaced seat 40 adjacent an outer end portion of the aperture. Each said seat 50 and 48 includes an annular frustoconical surface 49 and 51 and a cylindrical sidewall 53 and 55, respectively. The valve stem 28 includes an annular flange 60 formed on the lower end thereof and having a frustoconical surface 62 opposing the seat 48 and its frustoconical surface 51. Valve stem 28 also has a gland 64 mounted thereon which includes a frustoconical surface 66 which opposes seat 50 and its associated frustoconical surface 49.

Thus, it can be seen that the seats 49 and 50 cooperate with the cylindrical body portion of the stem and the annular frustoconical surfaces 62 and 66 carried thereby, to provide a pair of axially spaced seal ring receiving chambers.

Disposed within each said chamber is a seal ring member, designated 52 and 54, respectively. As can be seen in FIG. 5, which illustrates the packing box prior to final assembly, the seal rings 52 and 54 are of a frustoconical construction. Each seal ring 52 and 54 has cylindrical inner and outer peripheral or marginal surfaces. These surfaces are designated 56 and 57 for seal 52, and 58 and 59 for seal 54.

The radial width of each seal measured along the body thereof, dimension $a$ in FIG. 4, is greater than the effective radial width of the seal ring chamber, dimension $b$.

The seal rings 52 and 54 are advantageously fabricated from tough, moderately resilient, chemically resistant materials; and in this regard, fluorocarbon materials, both filled and unfilled, have proved eminently useful. The toughness and resilient resistance to compression of these materials enables hem to perform very efficiently for the purposes of the invention. Accordingly, the seal rings 52 and 54 are fabricated to take, in their initial or relaxed state as seen in FIG. 5, a degree of taper which differs from the taper provided in the frustoconical space between the receiving seats. For purposes of illustration, the rings 52 and 54 may be described as belleville washerlike members. As is shown in FIG. 5, the seal rings 52 and 54 are arranged to take, in their relaxed state, a degree of taper which is less abrupt than the corresponding taper of the receiving seats. Thus, upon tightening of the nut 40, forces will be stored in the material of the seal rings that will tend to urge the seal rings both against the opposing pairs of seats 50 and 66 and 48 and 62 and against the stem 28 and the opposing wall of bonnet 14. Also, with this arrangement the springlike action afforded by the shape of said washers will cause the inner peripheral surfaces 56 and 58 of said seals to engage sealingly the stem 28 in the initial or pretightened condition of FIG. 5. Thus, should the packing box arrangement become loose or should the seals wear slightly in service, a fluidtight joint is insured.

As previously indicated, the force applied along arrow 44 during operation of the valve unit tends to pivot or rock the stem about a transverse axis, as indicated by arrow 45, which axis is generally midway between the seal rings 52 and 54 and designated generally 68 in FIG. 4. It will be observed that upon tightening of retainer nut 40 the sealing members 52 and 54 will be placed in compression and set up forces having components as indicated by arrows 70, 72, 74 and 76. These reaction forces arise by virtue of internal resistance of the material of seal rings 52 and 54 to their being compressed. It is to be noted that, as a result of the specific disposition of the seal rings and cooperating seats and surfaces, the annular surfaces 52' and 54' of said sealing members 52 and 54 are directed more or less radially toward the center of rocking 68, and are disposed transverse to the path of rocking movement of said stem 28. Accordingly, the compressive forces indicated by arrows 70, 72, 74 and 76 will be directed transversely of and generally normal to surfaces 52' and 54' of the seal rings and will directly resist rocking movement, as represented by arrow 45.

In addition, it will be seen that the inner and outer peripheral edges of seals 52 and 54 will abut or engage the stem 28 and the cylindrical wall of the seats 48 and 50, respectively. Thus, any tendency for the stem 28 to rock will also be opposed by the components 82 and 84 of the compressive forces established with regard to the inner and outer peripheral surfaces of said seals.

From the above, it should be clear that in order to achieve maximum resistance to rocking of stem 28 by the seals of the packing box assembly, the forces established with regard to the surfaces of said seals when compressed must directly oppose said movement. On the other hand, if the compressive forces are directed radially with respect to the center of movement 68, as is the case with the prior art, they are not available to oppose rocking movement.

While the seal rings 52 and 54 provide highly effective means for preventing the escape of fluid around the valve stem, it has been found that an additional sealing element may sometimes be advantageous when the valve unit is to be installed in hazardous or high vacuum service. More specifically, an O-ring 78 is inserted in an annular groove 80 formed in the valve stem substantially midway between the seal rings 52 and 54, a point which is on the neutral axis of possible rocking movements of the valve stem.

It should be appreciated that the seal ring 52 is "backseated," i.e., it is supported against line pressure by the seat 48. Accordingly, line pressure in the valve works against seal ring 52 to enhance the sealing effect, preventing leakage. In addition, it should be recognized that wear of the seal rings may be compensated for, throughout the life of the valve, by periodic tightening of the nut 40.

Turning now to FIGS. 6 and 7, a modified packing box seat assembly in accordance with the present invention is shown. This packing box seat assembly is quite similar to that of FIGS. 1—5, and accordingly, parts or elements identical to those already described will be designated by the same reference numerals.

The embodiment of FIGS. 6 and 7 differ from the previously discussed packing box assembly in that flat or horizontal seats 90 and 92 are employed instead of the frustoconical seats 48 and 50.

In FIG. 6 the packing seat assembly is illustrated in the initial condition, that is, before retainer nut 40 has been tightened to draw the elements into sealing engagement. Similar to the previously discussed embodiment the annular sealing members 94 and 96 are frustoconical and approximate the shape of a belleville spring or washer. Each said seal is provided with coaxial inner and outer peripheral surfaces, designated 94' and 94'', respectively.

Accordingly, upon initial assembly, the sealing member will be stressed slightly with the coaxial inner and outer peripheries thereof engaging the stem 28 and the cylindrical surface of the seal seat, respectively. Due to this slight stressing of each said seal member 94 and 96 upon initial assembly, compressive forces are established, as illustrated, which insure an effective seal at all times.

In FIG. 7, the packing box assembly is illustrated in the tightened condition, achieved by advancing the retainer nut 40 along the threaded portion of stem 28. As was described previously with regard to the embodiment of FIGS. 1—5, this places the sealing members 94 and 96 in axial, as well as radial compression.

The forces exerted by the compressed sealing members on the stem 28 and the elements of the bonnet 14 are represented by the arrows 100, as seen in the left-hand portion of FIG. 7. Quite obviously, said compressive forces 100 for seals 94 and 96 may be resolved into resultant forces, which are shown in the right-hand portion of FIG. 7, and designated 101.

Upon operation of the valve unit, the stem 28 will tend to pivot or rock about the point 68, as indicated by arrow 45. Accordingly, as was detailed more fully with regard to FIGS. 1-—5, since the resultant forces 101 are transversely of and in direct opposition to the path of movement indicated by arrow 45, rocking of the stem is precluded.

The annular sealing members 94 and 96, like members 52 and 54 are also fabricated from tough, resilient plasticlike material such as Teflon. Materials of this particular type are characterized by the fact that they will return to their original configuration after being stressed. This property is often referred to in the art as the "memory" of the material. After some wear on the inner peripheries of said seals due to turning of the stem 28, the seal, with its memory characteristic, will tend to resume its initial belleville shape, thus keeping the inner periphery thereof in engagement with stem 28 and assuring a continued sealing effect.

While preferred embodiments of the present invention have been shown and described herein, it is obvious that many structural details may be changed without departing from the spirit and scope of the appended claims.

The invention I claim is as follows:

1. A valve unit comprising: a body member having a passageway therethrough and including a wall perforated with a stem-passing aperture; a valve element disposed within said body member and being rotatable for opening and closing said passageway; stem means interconnected with said valve element and extending outwardly through said aperture, said stem having an outer end portion connectable with means for rotating the stem and the associated valve element; said body member including a pair of annular oppositely disposed outwardly facing seal ring seats, each said seat including an annular seal-engaging surface and a cylindrical sidewall coaxial with said aperture; said stem means including a second pair of axially spaced annular seal-engaging surfaces which are complementary to said annular surfaces of said seats whereby said stem means and said seal ring seats cooperate to define a pair of annular seal-seating chambers; an annular seal ring disposed in each said chamber, each said ring in the unstressed condition including substantially cylindrical inner and outer peripheral surfaces and substantially parallel, frustoconical upper and lower surfaces, said rings being dimensioned with respect to said chambers such that upon initial assembly said inner and outer cylindrical surfaces will be in sealing engagement with the stem means and said cylindrical sidewalls respectively, with final assembly of said unit elastically deforming said seal rings to bring the said annular sealing engaging surfaces into contiguous contact with upper and lower surfaces of said seal rings while maintaining the inner and outer peripheral surfaces in engagement with the stem and said cylindrical sidewalls, such that said rings are placed in compression, with the compressive forces established opposing rocking movement of said stem.

2. A valve unit as defined in claim 1 wherein said annular seal-engaging surfaces of the seal ring seats and the stem are of a frustoconical configuration.

3. A valve unit as defined in claim 2 wherein the conical taper of said sealing ring members is less abrupt than that of said annular surfaces.

4. A valve unit as defined in claim 1 wherein said annular seal-engaging surfaces are disposed in planes perpendicular to the axis of said stem.

5. A valve unit comprising body means having a passageway therethrough and including a wall perforated with a stem-passing aperture, a valve element disposed within said body means and being rotatable for opening and closing said passageway, a stem interconnected with said valve element and extending outwardly through said aperture, said stem having an outer end portion connectable with means for turning the stem for rotating the valve element, said body means including a pair of axially spaced frustoconical seal-engaging surfaces encircling said stem, said stem having a pair of correspondingly shaped surfaces opposing said frustoconical surfaces on the body means, and an annular frustoconical seal ring member disposed and compressed between each said pair of opposed surfaces, said frustoconical surfaces on the body means and the stem converging toward the axis of said stem whereby the compressive forces stored in said sealing members will directly oppose rocking of said stem relative to said body means.

6. A valve unit as defined in claim 5 wherein said stem has a substantially cylindrical surface, and said seal rings respectively include inner substantially cylindrical edge surfaces in sealing engagement with said cylindrical surface of the valve stem.

7. A valve unit as defined in claim 5, wherein said stem includes annular groove means disposed generally midway between said seal rings and wherein said valve unit further comprises an O-ring disposed in said annular groove means sealingly engaging said body means between said seal rings.

8. A valve unit comprising: a body member having a passageway therethrough and including a wall perforated with a stem passing aperture; a valve element disposed within said body member and being rotatable for opening and closing said passageway; stem means interconnected with said valve element and extending outwardly through said aperture, said stem having an outer end portion connectable with means for rotating the stem and the associated valve element; said body member including a pair of annular oppositely disposed outwardly facing seal ring seats, each said seat including an annular seal-engaging surface and a cylindrical sidewall coaxial with said aperture; said stem means including a second pair of axially spaced annular surfaces which are complementary to said annular surfaces of said seats whereby said stem means and said seal ring seats cooperate to define a pair of annular seal-seating chambers; an annular seal ring disposed in each said chamber, each said ring in the unstressed condition including substantially cylindrical inner and outer peripheral surfaces and substantially parallel, frustoconical upper and lower surfaces, the radial dimensions of said frustoconical upper and lower surfaces being slightly greater than that of the corresponding seal-seating chamber, whereby upon initial assembly of said seals in said chambers they are deformed elastically from their original configuration with the cylindrical inner and outer surfaces thereof sealingly engaged with the corresponding surfaces of said chamber.

9. A packing box construction for a valve unit of the type including a body member with a passageway therein, a valve element disposed for selective blocking and unblocking of said passageway, an aperture in said body member, and stem means within said aperture and being operably associated with said valve element for movement thereof upon rotation of said stem means, said packing box construction comprising: a pair of annular seal ring seats formed in the body member, said seats being contiguous to and axially spaced along the length of said aperture; a pair of axially spaced annular surfaces on said stem means cooperating with said seal ring seats to define a pair of seal ring-receiving chambers; an annular seal ring member disposed in each said chamber, each said seal ring being initially formed as a frustoconical member from a resilient, plasticlike material, and having cylindrical inner and outer peripheral surfaces, the radial distance between said peripheral surfaces along the seal being greater than the radial width of said chamber, the difference such that said seals must be deformed slightly upon initial assembly in said chamber with said inner and outer peripheral surfaces sealingly engaging the stem and the seal ring seat, respectively; and means to draw the packing assembly into tight sealing engagement whereby said seal ring will be placed in compression.

10. A packing box construction as defined in claim 9 wherein said annular surfaces on the stem means are frustoconical, and said seal ring seats include a correspondingly shaped annular frustoconical surface opposing said stem means surfaces, said surfaces converging in a direction toward the axis of said stem means, such that the compressive forces established in said seal rings directly oppose rocking of said stem means relative to the body of the valve unit.

11. A packing box construction as defined in claim 10 wherein the conical taper of said sealing rings is less abrupt than that of said frustoconical surfaces.

12. A packing box construction as defined in claim 9 wherein said annular surfaces on the stem means are substantially planar, and said seal ring seat includes an annular, planar surface opposing said planar stem means surfaces.

PO-1050
(5/69)

UNITED STATES PATENT OFFICE
CERTIFICATE OF CORRECTION

Patent No. 3,582,041          Dated June 1, 1971

Inventor(s) Werner K. Priese

It is certified that error appears in the above-identified patent and that said Letters Patent are hereby corrected as shown below:

Column 1, line 21, "tend to shift the stem transversely to its axis of rotation or to" should read
--tend to shift the stem transversely of its axis of rotation or to--

Column 1, line 31, "minimize the possibility of leakage and whereby to reduce" should read
--to minimize the possibility of leakage and whereby to reduce--

Column 2, line 43, "seat 40 adjacent an outer end portion of the aperture. Each" should read
--seat 50 adjacent an outer end portion of the aperture. Each--

Column 2, line 52 "Thus, it can be seen that the seats 49 and 50 cooperate with" should read
--Thus, it can be seen that the seats 48 and 50 cooperate with--

Column 2, line 71, "hem to perform very efficiently for the purposes of the inven-" should read
--them to perform very efficiently for the purposes of the inven- --

Column 6, line 21 in Claim 9, "means within said aperture and being operably associated with" should read
--means received within said aperture and being operably associated with--

Signed and sealed this 11th day of January 1972.

(SEAL)
Attest:

EDWARD M. FLETCHER, JR.      ROBERT GOTTSCHALK
Attesting Officer             Acting Commissioner of Patents